US012602597B2

(12) United States Patent　　　　(10) Patent No.: US 12,602,597 B2
Fix et al.　　　　　　　　　　　　　(45) Date of Patent: Apr. 14, 2026

(54) AUTOMATIC DISCOVERY OF MACHINE LEARNING MODEL FEATURES

(71) Applicant: AT&T Intellectual Property I, L.P., Atlanta, GA (US)

(72) Inventors: Jeremy Fix, Acworth, GA (US); Cuong Vo, Sachse, TX (US); Eric Zavesky, Austin, TX (US); Abhay Dabholkar, Allen, TX (US); Rudolph Mappus, Plano, TX (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1235 days.

(21) Appl. No.: 17/486,770

(22) Filed: Sep. 27, 2021

(65) Prior Publication Data

US 2023/0099502 A1　　Mar. 30, 2023

(51) Int. Cl.
　　*G06N 5/022*　　　　(2023.01)
(52) U.S. Cl.
　　CPC .................................... *G06N 5/022* (2013.01)
(58) Field of Classification Search
　　CPC ...................................................... G06N 5/022
　　See application file for complete search history.

(56) References Cited

U.S. PATENT DOCUMENTS

2020/0265324 A1 *　8/2020　Ferreira Moreno ... G06N 5/022
2023/0031691 A1 *　2/2023　Carroll ................... G06N 3/045

OTHER PUBLICATIONS

Prince Paulraj et al., "Governance Mechanisms for Reuse of Machine Learning Models and Features," U.S. Appl. No. 17/646,708, filed Dec. 31, 2021.
Cuong Vo et al., "Reuse of Machine Learning Models," U.S. Appl. No. 17/486,798, filed Sep. 27, 2021.

* cited by examiner

*Primary Examiner* — Ann J Lo

(57)　　　　　　　ABSTRACT

A method performed by a processing system including at least one processor includes monitoring interactions of a human user with a platform for building machine learning models, where the human user is using the platform to build a new machine learning model, detecting, within the interactions, an event that triggers a suggestion feature, performing a search of a data source for existing data from existing machine learning models which can be reused to build the new machine learning model, using information about the event, presenting a suggestion to the human user to reuse a portion of the existing data discovered in the search in the new machine learning model, receiving a user feedback in response to the suggestion, and generating an updated suggestion in response to the user feedback.

20 Claims, 3 Drawing Sheets

<u>200</u>

Figure 2:
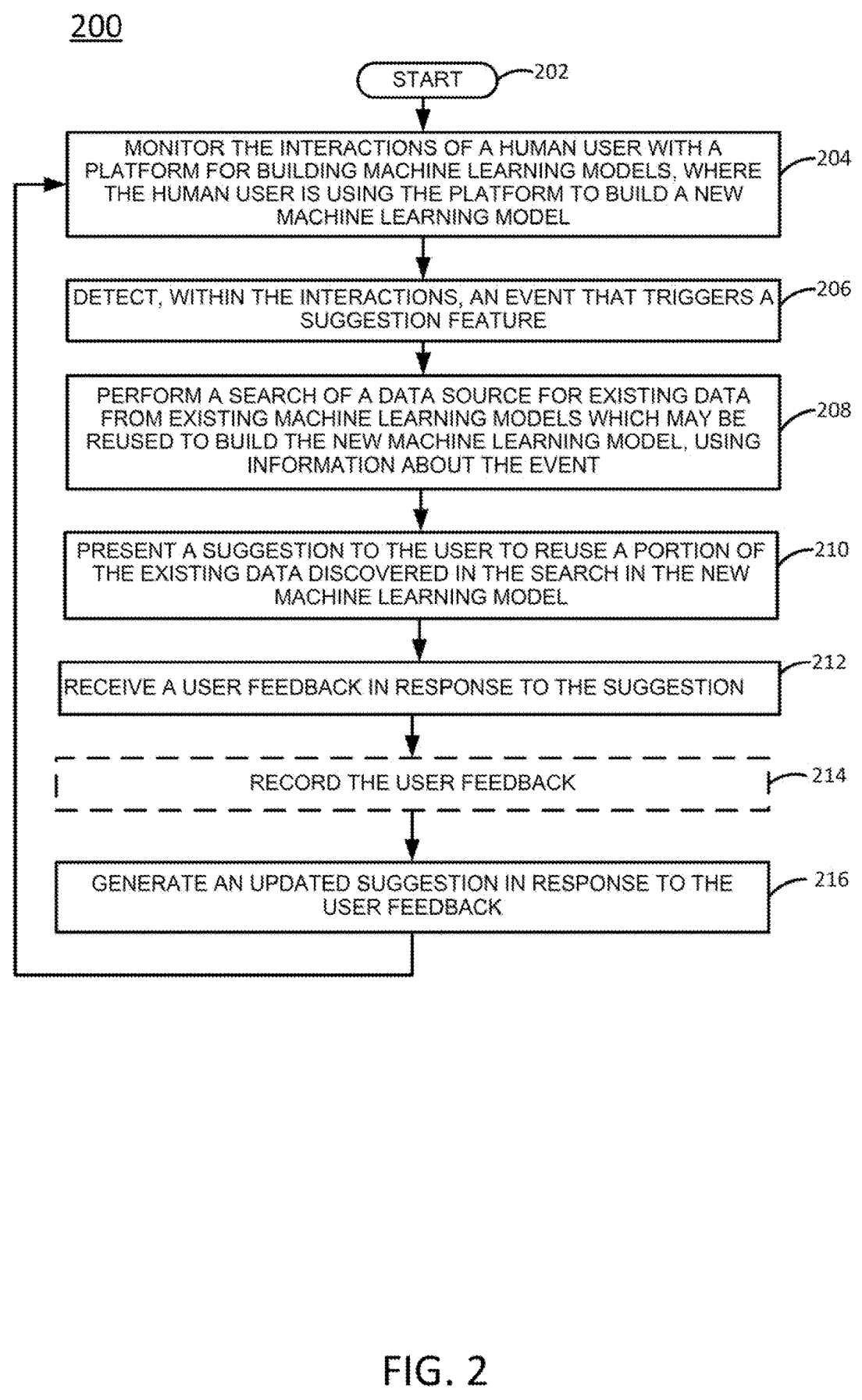

200

```
                              ┌─────────────┐
                              │    START    │──── 202
                              └─────────────┘
                                     │
                                     ▼
        ┌──────────────────────────────────────────────────────┐
        │  MONITOR THE INTERACTIONS OF A HUMAN USER WITH A      │
        │  PLATFORM FOR BUILDING MACHINE LEARNING MODELS, WHERE │──── 204
        │  THE HUMAN USER IS USING THE PLATFORM TO BUILD A NEW  │
        │           MACHINE LEARNING MODEL                      │
        └──────────────────────────────────────────────────────┘
                                     │
                                     ▼
        ┌──────────────────────────────────────────────────────┐
        │  DETECT, WITHIN THE INTERACTIONS, AN EVENT THAT       │──── 206
        │  TRIGGERS A SUGGESTION FEATURE                        │
        └──────────────────────────────────────────────────────┘
                                     │
                                     ▼
        ┌──────────────────────────────────────────────────────┐
        │  PERFORM A SEARCH OF A DATA SOURCE FOR EXISTING DATA  │
        │  FROM EXISTING MACHINE LEARNING MODELS WHICH MAY BE   │──── 208
        │  REUSED TO BUILD THE NEW MACHINE LEARNING MODEL, USING│
        │           INFORMATION ABOUT THE EVENT                 │
        └──────────────────────────────────────────────────────┘
                                     │
                                     ▼
        ┌──────────────────────────────────────────────────────┐
        │  PRESENT A SUGGESTION TO THE USER TO REUSE A PORTION  │
        │  OF THE EXISTING DATA DISCOVERED IN THE SEARCH IN THE │──── 210
        │           NEW MACHINE LEARNING MODEL                  │
        └──────────────────────────────────────────────────────┘
                                     │
                                     ▼
        ┌──────────────────────────────────────────────────────┐
        │  RECEIVE A USER FEEDBACK IN RESPONSE TO THE SUGGESTION│──── 212
        └──────────────────────────────────────────────────────┘
                                     │
                                     ▼
        ┌ ─ ─ ─ ─ ─ ─ ─ ─ ─ ─ ─ ─ ─ ─ ─ ─ ─ ─ ─ ─ ─ ─ ─ ─ ─ ─ ┐
          │          RECORD THE USER FEEDBACK                   ──── 214
        └ ─ ─ ─ ─ ─ ─ ─ ─ ─ ─ ─ ─ ─ ─ ─ ─ ─ ─ ─ ─ ─ ─ ─ ─ ─ ─ ┘
                                     │
                                     ▼
        ┌──────────────────────────────────────────────────────┐
        │  GENERATE AN UPDATED SUGGESTION IN RESPONSE TO THE    │──── 216
        │           USER FEEDBACK                               │
        └──────────────────────────────────────────────────────┘
```

AUTOMATIC DISCOVERY OF MACHINE LEARNING MODEL FEATURES

The present disclosure relates generally to machine learning, and relates more particularly to devices, non-transitory computer-readable media, and methods for automated discovery of machine learning models features during creation of machine learning models.

BACKGROUND

Machine learning is a subset of artificial intelligence encompassing computer algorithms whose outputs improve with experience. A set of sample or "training" data may be provided to a machine learning algorithm, which may learn patterns in the training data that can be used to build a model that is capable of making predictions or decisions (outputs) based on a set of inputs (e.g., new data). Machine learning models may be used to automate the performance of repeated tasks, to filter emails, to provide navigation for unmanned vehicles, and to perform numerous other tasks or actions.

SUMMARY

The present disclosure broadly discloses methods, computer-readable media, and systems for automated discovery of machine learning models features during creation of machine learning models. In one example, a method performed by a processing system including at least one processor includes monitoring interactions of a human user with a platform for building machine learning models, where the human user is using the platform to build a new machine learning model, detecting, within the interactions, an event that triggers a suggestion feature, performing a search of a data source for existing data from existing machine learning models which can be reused to build the new machine learning model, using information about the event, presenting a suggestion to the human user to reuse a portion of the existing data discovered in the search in the new machine learning model, receiving a user feedback in response to the suggestion, and generating an updated suggestion in response to the user feedback.

In another example, a non-transitory computer-readable medium may store instructions which, when executed by a processing system including at least one processor, cause the processing system to perform operations. The operations may include monitoring interactions of a human user with a platform for building machine learning models, where the human user is using the platform to build a new machine learning model, detecting, within the interactions, an event that triggers a suggestion feature, performing a search of a data source for existing data from existing machine learning models which can be reused to build the new machine learning model, using information about the event, presenting a suggestion to the human user to reuse a portion of the existing data discovered in the search in the new machine learning model, receiving a user feedback in response to the suggestion, and generating an updated suggestion in response to the user feedback.

In another example, a device may include a processing system including at least one processor and a non-transitory computer-readable medium storing instructions which, when executed by the processing system, cause the processing system to perform operations. The operations may include monitoring interactions of a human user with a platform for building machine learning models, where the human user is using the platform to build a new machine learning model, detecting, within the interactions, an event that triggers a suggestion feature, performing a search of a data source for existing data from existing machine learning models which can be reused to build the new machine learning model, using information about the event, presenting a suggestion to the human user to reuse a portion of the existing data discovered in the search in the new machine learning model, receiving a user feedback in response to the suggestion, and generating an updated suggestion in response to the user feedback.

BRIEF DESCRIPTION OF THE DRAWINGS

The teachings of the present disclosure can be readily understood by considering the following detailed description in conjunction with the accompanying drawings, in which:

FIG. 2 illustrates a flowchart of an example method for discovering a machine learning model for performant reuse, in accordance with the present disclosure;

To facilitate understanding, similar reference numerals have been used, where possible, to designate elements that are common to the figures.

DETAILED DESCRIPTION

Figure 1:
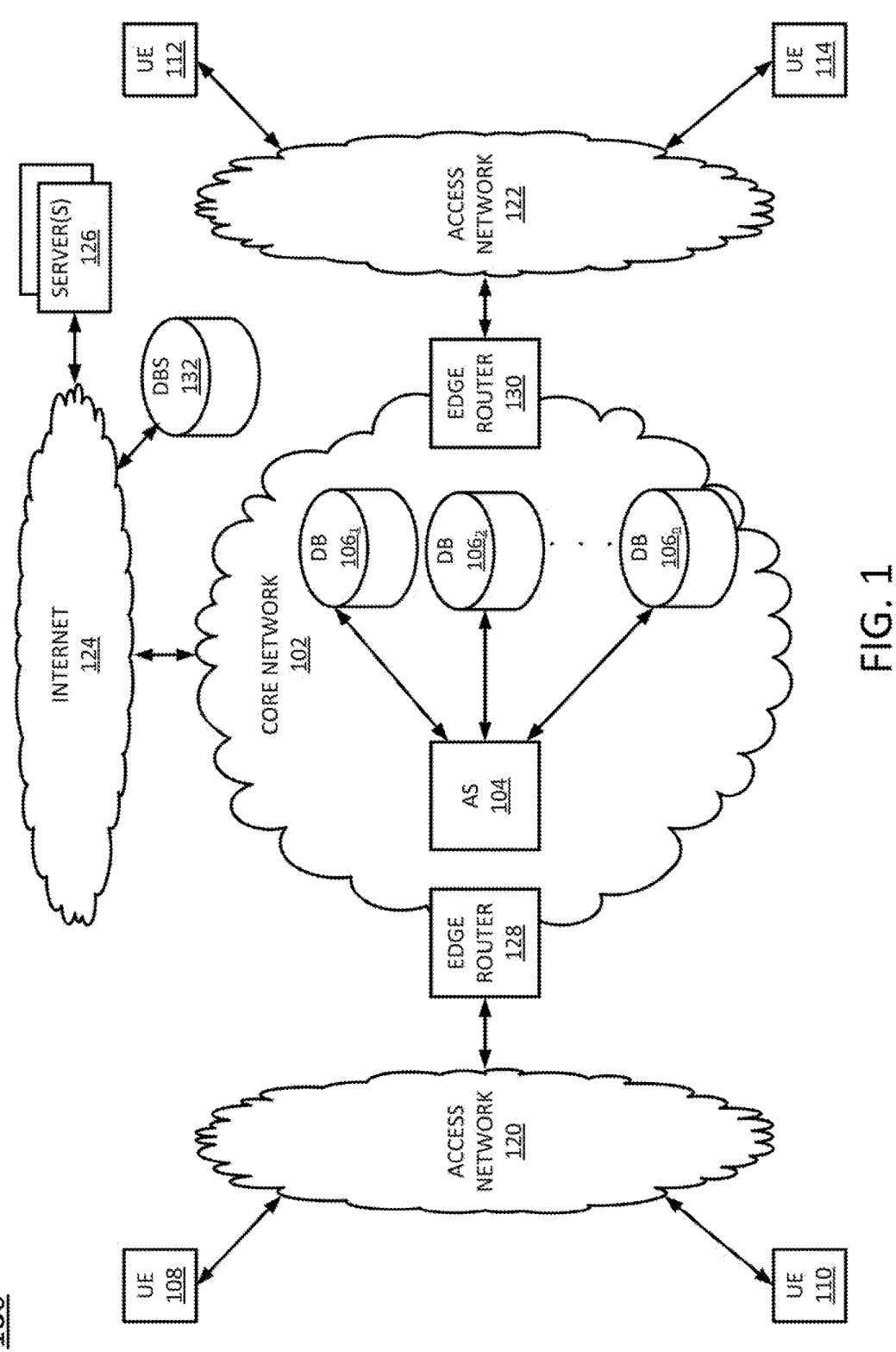
FIG. 1 illustrates an example system in which examples of the present disclosure for building and deploying a machine learning model may operate.

The present disclosure broadly discloses methods, computer-readable media, and systems for automated discovery and hybridization of machine learning models for performant reuse. As discussed above, machine learning models are trained using a set of training data to make predictions or decisions (outputs) based on a set of inputs (e.g., new data). Recent developments allow even individuals with minimal data analysis expertise to build, train, and deploy machine learning models. For instance, the ability to reuse existing machine learning models (or even parts of existing machine learning models) allows developers to leverage techniques that are already known to work, rather than build new machine learning models completely from scratch. However, discovery of existing machine learning models or features which may be suitable for reuse in a given application is not always a simple matter. Thus, opportunities to improve the output of new machine learning models, or to expedite the development and deployment of the new machine learning models, may be missed.

Examples of the present disclosure provide an automated means for reviewing existing machine learning models, reviewing features of existing machine learning models (which may be available for reuse but outside the scope of a new machine learning model being built), and for performing follow-up analysis after deployment of a machine learning model to evaluate performance, detect biases, and the like. In this way, existing machine learning models and features which may be appropriate for reuse (given the expected inputs and/or predictions of a new machine learning model to be built) can be easily identified, thereby improving the efficiency of the process for building new machine learning models.

In particular, as a user is developing a machine learning model, examples of the present disclosure may automatically offer suggestions to expedite the development of the machine learning model. The suggestions may be derived from data about the context of the machine learning model being developed (e.g., use case, type of predictions, etc.), data sets associated with the machine learning model (e.g., training and/or sample data sets), and/or observed past behaviors (e.g., choices) of the user developing the machine learning model. The suggestions may include a list of existing machine learning models (or parts of existing machine learning models, such as features, data sets, algorithms, etc.) which may be candidates for reuse during a particular step of the development process. The suggestions may evolve and support several aspects of model construction, including real-time training and behavioral improvement for the user, improvements during the model building process through incorporation of various strategies (e.g., ensemble strategies, features recommendations, parameter tuning, model benchmarking, fairness validation, etc.), and model maintenance (including the application of relevant policies which may be important for long-term usage but not considered during the initial building process such as model drift, retraining, insight exposure for business intelligence, etc.). These and other aspects of the present disclosure are discussed in greater detail below in connection with the examples of FIGS. 1-3.

To further aid in understanding the present disclosure, FIG. 1 illustrates an example system 100 in which examples of the present disclosure for building and deploying a machine learning model may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, a plurality of databases (DBs) 106$_1$-106$_n$ (hereinafter individually referred to as a "database 106" or collectively referred to as "databases 106"), and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/ Wi-Fi network and the like), cellular access networks, 3$^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 300 depicted in FIG. 3, and may be configured as described below. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like. In one example, any one of the user endpoint devices 108, 110, 112, and 114 may be operable by a human user to provide guidance and feedback to the AS 104, which may be configured to build and deploy machine learning models by reusing components of existing machine learning models, as discussed in greater detail below.

In one example, one or more servers 126 and one or more databases 132 may be accessible to user endpoint devices 108, 110, 112, and 114 via Internet 124 in general. The server(s) 126 and DBs 132 may be associated with Internet content providers, e.g., entities that provide content (e.g., news, blogs, videos, music, files, products, services, or the like) in the form of websites (e.g., social media sites, general reference sites, online encyclopedias, or the like) to users over the Internet 124. Thus, some of the servers 126 and DBs 132 may comprise content servers, e.g., servers that store content such as images, text, video, and the like which may be served to web browser applications executing on the user endpoint devices 108, 110, 112, and 114 and/or to AS 104 in the form of websites.

Figure 3:
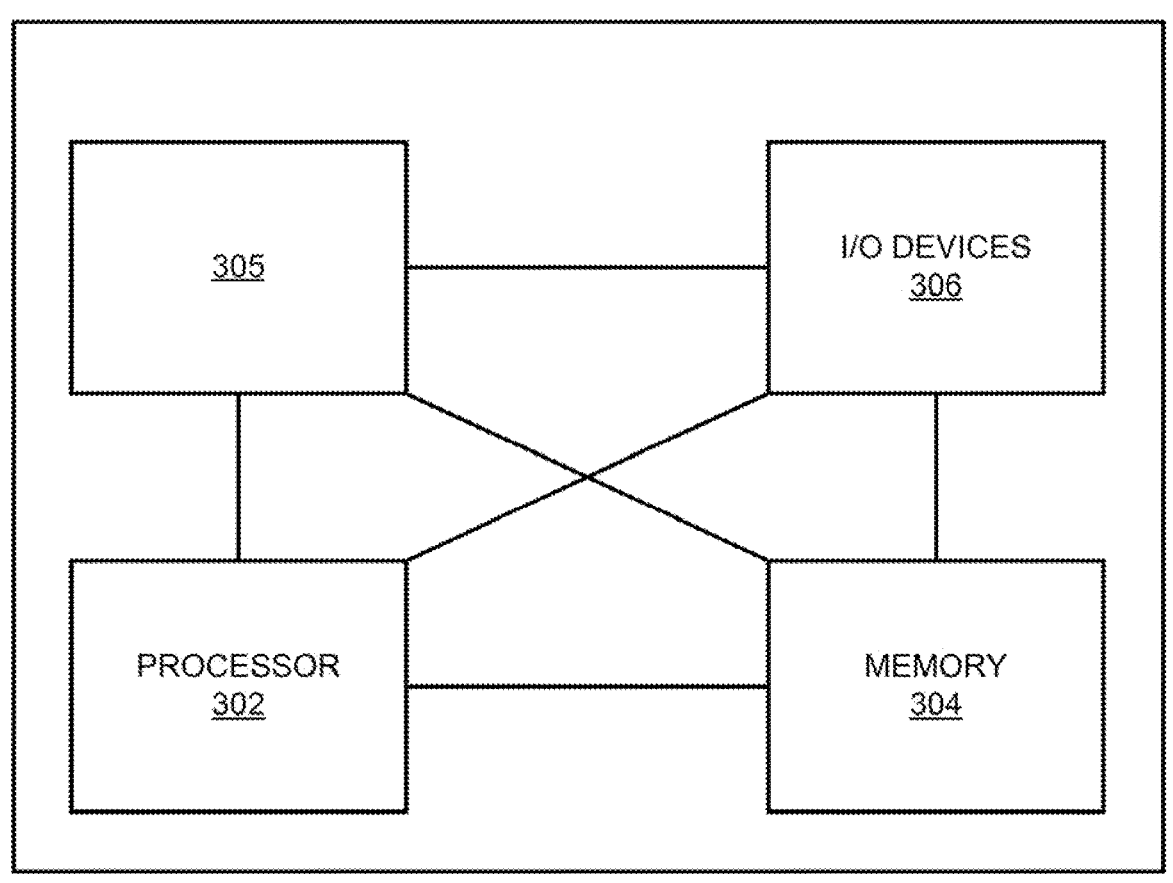
FIG. 3 illustrates an example of a computing device, or computing system, specifically programmed to perform the steps, functions, blocks, and/or operations described herein.

In accordance with the present disclosure, the AS 104 may be configured to provide one or more operations or functions in connection with examples of the present disclosure for building and deploying machine learning models by reusing existing machine learning models, as described herein. The AS 104 may comprise one or more physical devices, e.g., one or more computing systems or servers, such as computing system 300 depicted in FIG. 3, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, the AS 104 may be configured to build, train, and/or update new machine learning models by reusing components of existing machine learning models. In particular, the AS 104 may be configured to identify existing machine learning models (and features of existing machine learning models) which may be reused at various stages in the building of a new machine learning model. For instance, in one example, the AS 104 may be programmed to compare metadata describing a new machine learning model, notes describing the new machine learning mode, or even code for the new machine learning model against a repository of existing machine learning models and to identify components of the existing machine learning models which may be reused to build, train, and/or update the new machine learning model. Any existing machine learning models (or components thereof) which are identified as candidates for reuse may be suggested to the human user who is building the new machine learning model at various stages during the building, training, and deployment of the new machine learning model, as discussed in greater detail below.

Existing machine learning models may be acquired from a plurality of sources. For instance, each of the DBs 106 and 132 may comprise a different source of existing machine learning models, components of which may be reused to create a new machine learning model (also referred to herein as a "hybrid" machine learning model, since the model may contain reused components of existing machine learning models as well as newly created, use case-specific components). As an example, DB 106$_1$ may contain whole machine learning models which may have been previously built and/or deployed; DB 106$_2$ may contain templates or generic frameworks which may be customized to create a variety of different machine learning models; DB 106$_n$ may contain excerpts or snippets of code (e.g., individual code blocks or functions) extracted from machine learning models which may have been previously built and/or deployed; and a DB 132 may contain input and/or output data features extracted from machine learning models which may have been previously built and/or deployed. Additional DBs may contain other types of data extracted from existing machine learning models. The DBs 106 and 132 may comprise proprietary databases controlled by an enterprise (e.g., a business, a university, or the like) for internal use or may comprise part of a marketplace or service to which users may subscribe.

In one example, the DBs 106 may comprise physical storage devices integrated with the AS 104 (e.g., a database server or a file server), or attached or coupled to the AS 104, in accordance with the present disclosure. In one example, the AS 104 may load instructions into a memory, or one or more distributed memory units, and execute the instructions for building and deploying machine learning algorithms by reusing existing machine learning models as described herein. One example method for assisting a human user who is building a new machine learning model by suggesting existing machine learning models for reuse is described in greater detail below in connection with FIG. 2.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

FIG. 2 illustrates a flowchart of an example method 200 for discovering a machine learning model for performant reuse, in accordance with the present disclosure. In one example, the method 200 may be implemented as a stand-alone system or software program that sits between a notebook service (e.g., a software program or service used for developing code for machine learning models) and a target platform on which machine learning models can be built, trained, and deployed at scale. In another example, the method 200 may be implemented as a generic plug-in which may be integrated into existing artificial intelligence/machine learning platforms. In this case, a customizable, configurable context pass-through may provide environmental awareness and RESTful application programming interfaces (APIs) for suggestion queries. Moreover, the method 200 could be performed both online and offline (e.g., utilizing cached data associated with existing machine learning models in the latter case).

For instance, in one example, steps, functions and/or operations of the method 200 may be performed by a device as illustrated in FIG. 1, e.g., AS 104 or any one or more components thereof. In another example, the steps, functions, or operations of method 200 may be performed by a computing device or system 300, and/or a processing system 302 as described in connection with FIG. 3 below. For instance, the computing device 300 may represent at least a portion of the AS 104 in accordance with the present disclosure. For illustrative purposes, the method 200 is described in greater detail below in connection with an example performed by a processing system in an Internet service provider network, such as processing system 302.

The method 200 begins in step 202 and proceeds to step 204. In step 204, the processing system may monitor the interactions of a human user with a platform for building machine learning models, where the human user is using the platform to build a new machine learning model. In one example, for instance, the human user may be a data scientist who is building the new machine learning model to address a specific problem or a specific business case. For instance, the new machine learning model may be needed to identify candidates for a job opening, to filter email, to navigate an unmanned vehicle, or the like.

In step 206, the processing system may detect, within the interactions, an event that triggers a suggestion feature. In one example, the event may comprise an input provided by the human user to the platform for building machine learning models. For instance, in one example, the human user may provide as input to the platform a set of metadata describing the new machine learning model. The metadata may describe one or more parameters of the new machine learning model, such as the features the new machine learning model will take as input, the target (e.g., prediction output) of the new machine learning model, one or more performance criteria (e.g., speed, deployment, quality, metrics for evaluation, etc.), source and/or target domain, and/or other parameters.

In another example, the human user may provide as input to the platform a set of notes or even code for building the new machine learning model. For instance, the human user may write one or more code blocks or functions for parts of the machine learning model, may select input features for the machine learning model, may select values for one or more performance criteria of the machine learning model, or the like.

In another example, the human user may provide as input to the platform a set of training data for training the new machine learning model. For instance, the new machine learning model may be fully coded, but may still need to be trained to generate predictions. Thus, the human user may provide a set of training data (e.g., features) to train the new machine learning model and/or may provide one or more target performance criteria or metric for the output of the trained new machine learning model.

In step 208, the processing system may perform a search of a data source for existing data from existing machine learning models which may be reused to build the new machine learning model, using information about the event. In one example, the data source may comprise one of a variety of sources. For instance, in one example, an existing machine learning model or extract, transform, and load (ETL) source may come from reusable APIs which have already been created. In another example, a crawler may search a repository of existing (i.e., already built, trained, tested, and/or deployed) machine learning models for new entries. In a further example, if the inputs, outputs, and/or targets of an existing machine learning model are unknown, the processing system may attempt to automatically negotiate by evaluating a sample data frame associated with the existing machine learning model against the needs of the new machine learning model (e.g., as described in the metadata).

In one example, the processing system may search the data source for existing machine learning models that are directed to a similar domain space (e.g., financial markets, security, job training, etc.) as the new machine learning model. In another example, the processing system may search the data source for existing machine learning models that are directed to a similar functional space (e.g., forecasting, classification, recommendation, etc.) as the new machine learning model.

In one example, the processing system may utilize the inputs which triggered the event as parameters for searching the data source. The current context of the building process (e.g., how far along the user is in the building process) may also be used as a search parameter. For instance, if the event was triggered by the human user inputting metadata describing the new machine learning model, and if the human user has not yet started writing code for the new machine learning model, then the processing system may search the data source for existing machine learning models whose metadata may match or relate to the input metadata.

As an example, an existing machine learning model may match the new machine learning model when metadata describing the input of the existing machine learning model is similar to metadata describing the input of the new machine learning model and/or metadata describing the target of the existing machine learning model is similar to metadata describing the target of the new machine learning model. In further examples, the similarity may be based on similarities in metadata describing users or datasets from which the inputs are extracted.

For instance, metadata tags describing the new machine learning model may indicate that the target of the new machine learning model is to identify job candidates for a data scientist position. Metadata tags describing an existing machine learning model may also indicate that the target of the existing machine learning model is to identify job candidates for a data scientist position. In one example, matching metadata tags may be identical (e.g., "data scientist" versus "data scientist"); however, in other examples, the metadata tags may match on a semantic or conceptual level rather than match verbatim (e.g. "data scientist" versus "data analyst").

In one example, the similarity between metadata may be assigned a score, and an existing machine learning model may be identified as a candidate for reuse in building the new machine learning model when the score at least meets a predefined threshold score. For instance, each parameter by which similarity may be measured (e.g., input, target, users, datasets, etc.) may be assigned an individual score, and the individual scores may be combined to form a final score. In one example, an individual score may comprise a binary score (e.g., zero for no match, one for match). In another example, an individual score may comprise a value that falls on a scale (e.g., zero for no match, fifty for a semantic or conceptual match, one hundred for an identical match). The individual scores may be combined by summing the individual scores, by taking an average of the individual scores, or by some other means. In a further example, the individual scores may be weighted to reflect the parameters for which a match may be more significant (e.g., where target is more significant than users, assign a greater weight to the individual score for target than to the individual score for users).

In step 210, the processing system may present a suggestion to the user to reuse a portion of the existing data discovered in the search in the new machine learning model. In one example, the suggestion may be based on the inputs which triggered the event as well as the current context of the building process (e.g., how far along the user is in the building process). For instance, if the event was triggered by the human user inputting metadata describing the new machine learning model, and if the human user has not yet started writing code for the new machine learning model, then the processing system may suggest one or more existing machine learning models that the human user might use as a starting point for building the new machine learning model. In another example, the processing system may suggest reusing only a portion of the existing data in order to quickly train and discover a new machine learning model. For instance, the processing system may reuse a portion of the existing data to perform abbreviated or optimized training and discovery of a larger portion or source of data. The processing system may also reuse one set of data as a means of connecting two previously disconnected or unconnected sets of data.

Similarly, if the event was triggered by the human user inputting notes or writing code, then the processing system may suggest one or more features of existing machine learning models that relate to the notes or code. As an example, if the human user's notes or code indicate that the new machine learning model will operate on inputs from a particular dataset to produce a particular type of prediction, then the processing system may suggest specific features of the particular dataset that were observed to generate satisfactory predictions by an existing machine learning model whose output was the same as or similar to the particular type of prediction.

In another example, if the event was triggered by the human user performing training of the new machine learning model (e.g., providing training data, providing target performance metrics or criteria for the machine learning output, etc.), then the processing system may suggest actions or data that can be used to tune and improve the new machine learning model. In one example, a feature store or repository may store a plurality of features extracted from a plurality of existing machine learning models. Any of the stored features may be recommended by the processing system for adding to a set of training data used to train the new machine learning model. Adding new features to the set of training data may help to tune the new machine learning model, to minimize biases which may have been present in the original set of training data, to improve the fairness of the new machine learning model's output, or the like.

In a further example, suggestions for tuning of the new machine learning model may comprise providing a plurality of options for systematic tuning, such as neural network nodes, layers extracted, learning rate, and intra-class sampling from existing machine learning models. In still further examples, other hyperparameters of the existing machine learning model(s) (e.g., neural networks, adversarial networks, support vector machines, etc.) may also be included as suggestions for the process, and may or may not be automatically evaluated on behalf of the human user. In yet another example, prior evaluations of these parameters may be discovered from historical models and preemptively excluded so as to minimize time spent on retraining. For instance, if the data, domain, inputs, and target outputs remain the same or very similar, then the processing system may decide to avoid a costly discovery and evaluation of the hyperparameters that have already been evaluated and approved as a model from the human user (or other users).

In one example, the processing system may rank any portions of the existing data which are suggested for reuse, e.g., in order of most suitable for reuse to least suitable for reuse, or vice versa. In one example, the rankings of the data may be based on some assessed relevance to the inputs that triggered the event (e.g., strongest metadata match). In another example, the rankings of the data may be based on reuse of the data by other users (e.g., existing machine learning models or features that are most frequently reused by other users, that are most highly rated by other users, etc.). In another example, the rankings of the data may be based on some target performance metric for the new machine learning model and/or a performance metric of an existing machine learning model from which the existing data is extracted (e.g., error rate, accuracy, etc.). In one example, the rankings of the data may be based on a (optionally weighted) combination of relevance to the inputs, reuse by other users, and/or performance metrics.

In a further example, where the suggestions include features to be added to a set of training data, the suggested features may be ranked according to the magnitudes of the effects that addition of the suggested features is expected to have on the performance of the new machine learning model (e.g., as measured by impact on some performance metric or criteria that is defined by the human user).

In step 212, the processing system may receive a user feedback in response to the suggestion. In one example, the user feedback may comprise active feedback, such as the selection by the human user of a suggested existing machine learning model or feature of an existing machine learning model for reuse in the new machine learning model. In another example, the user feedback may comprise passive feedback, such as the human user ignoring the suggestion or continuing their interactions with the platform without interacting with the suggestion. In another example, the user feedback may comprise a more explicit form of feedback, such as the user clicking a button or other graphical user interface (GUI) features associated with the suggestion. The button may say, for instance, "More Like This," "Dismiss," "No Thanks," "Accept," or the like.

In optional step 214 (illustrated in phantom), the processing system may record the user feedback. Recording the user feedback may help the processing system to make more useful or more tailored suggestions to the human user in the future. For instance, the processing system may detect a pattern in which the human user frequently dismisses or declines suggestions related to particular machine learning model features, and may learn to make fewer suggestions relating to those particular machine learning model features to the human user. Recording the user feedback may also help the machine learning model to make better suggestions to other users. For instance, the user's response to certain suggestions could be tallied with the responses of other users to identify which existing machine learning models or features of existing machine learning models have been reused by the greatest number of users, which existing machine learning models or features of existing machine learning models earn the highest rating from users, or the like. In this way, future suggestions made by the processing system could be at least partially crowd-driven.

In step 216, the processing system may generate an updated suggestion in response to the user feedback. For instance, as discussed above, the processing system may detect a pattern in which the human user frequently dismisses or declines suggestions related to particular machine learning model features. In response, the processing system may adapt a manner of making suggestions so that a future suggestion makes fewer suggestions relating to those particular machine learning model features. In another example, where the user feedback may include more or new information about the new machine learning model that is currently being constructed, the processing system may update a suggestion that was already generated for the new machine learning model in light of the new information provided in the user feedback. For instance, the new information may include information about additional input features that the processing system was not previously aware of. Thus, the processing system may learn, from choices made by the human user throughout execution of the method 200, to make suggestions that are more personalized or better tailored to the needs of the human user.

The method 200 may return to step 204, and may continue to iterate through one or more of steps 204-216 until the human user completes building, training, and deployment of the new machine learning model or until the human user terminates the method 200 (e.g., by opting out of automated suggestions). Thus, the method 200 may provide assistance to the human user throughout all stages of the building, training, and deployment of new machine learning models.

In one example, steps 210-216 may be replaced by a fully automated process in which, rather than present and/or adapt the suggestion in response to feedback from the human user, the processing system may simply adopt the best (e.g., highest ranked) suggestion without interacting with the human user.

Examples of the present disclosure may therefore discover behaviors across both the horizontals (e.g., the application) and the verticals (e.g., the algorithm) during the building of new machine learning models, in order to identify existing machine learning models and features that may share metadata properties with the new machine learning models. The existing machine learning models and features may, in turn, be reused in the building of the new machine learning models, making for a process that is not only more efficient, but also leverages knowledge of what has worked (or not worked) in the past.

In some examples, governance and policy requirements for the new machine learning models can be added to the creation and development process (e.g., via suggestions and/or notifications of potential errors), allowing those governance and policy requirements to be discovered earlier in the process (as opposed to being discovered during post hoc analysis, as is typical). Model maintenance concerns may also be brought to the forefront, allowing maintenance concerns to be addressed during the design, evaluation, and/or deployment of the new machine learning models.

In further examples, the suggestions that are provided to the human user may be adapted or personalized to the user, e.g., based on a profile for the human user (which may specify the human user's historical needs as driven by their organization, job role, or the like) and/or the human user's context (which may indicate, for instance, when an application requires higher confidence, model stability, or the like).

Further examples of the present disclosure may be extended to improve the performance of systems that perform automated modeling (e.g., as opposed to human users performing the modeling). In particular, the feedback loop may help improve the machine learning models that are built by such systems. For instance, a machine learning task could be put to multiple such systems to develop a solution, e.g., as a "competition." The solution that "wins" may be used to modify and/or inform the development of future machine learning models designed to perform similar tasks.

In addition, as noted, user feedback may improve future application of examples of the present disclosure. Although examples of the present disclosure may provide best suggestions to a user (based on one or more predefined criteria), the user who is developing and/or deploying the machine learning model may override the suggestions. User override may cause examples of the present disclosure to adapt and to adjust the manner in which future suggestions are evaluated and/or proposed.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Examples of the present disclosure may prove useful in a variety of areas in which machine learning applications are used. For instance, examples of the present disclosure may be used to learn from and apply the behavior (e.g., choices and interactions with the system) of multiple machine learning/data science experts, in a manner similar to crowdsourcing. Metadata describing a problem to be solved by a new machine learning model may be considered as new features, allowing connections to be discovered from individual developers or data scientists as well as across a cohort of developers and data scientists. Moreover, different horizontal domain spaces (e.g., wireless telecommunications) may be coupled with each other and/or with multiple different vertical functional spaces (e.g., forecasting, classification, etc.).

In further examples, architecture selection may be simplified. Multiple formats may be automatically evaluated for linkage to a specific machine learning model that has horizontal and vertical links.

Moreover, new and experienced data scientists may learn from educational and inclusion behavior which are linked to model maintenance and long-term model usage. For instance, policies established by an organization for bias detection, bias avoidance, or the like can be used to preempt the choices of developers and to encourage the developers to be more cognizant of these policies during model creation and training.

FIG. 3 depicts a high-level block diagram of a computing device or processing system specifically programmed to perform the functions described herein. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for building and deploying a machine learning model, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for building and deploying a machine learning model (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for building and deploying a machine learning model (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:

monitoring, by a processing system including at least one processor, interactions of a human user with a platform for building machine learning models, where the human user is using the platform to build a new machine learning model;

detecting, by the processing system within the interactions, an event that triggers a suggestion feature;

performing, by the processing system, a search of a data source for existing data from existing machine learning models which can be reused to build the new machine learning model, using information about the event, wherein a search parameter for the search is based on a current context of a building process for building the new machine learning model;

presenting, by the processing system, a suggestion to the human user to reuse a portion of the existing data discovered in the search in the new machine learning model;

receiving, by the processing system, a user feedback in response to the suggestion; and generating, by the processing system, an updated suggestion in response to the user feedback.

2. The method of claim 1, wherein the event comprises an input provided by the human user to the platform for building the new machine learning model.

3. The method of claim 2, wherein the input comprises a set of metadata describing the new machine learning model.

4. The method of claim 3, wherein the set of metadata describes at least one of: a feature the new machine learning model will take as input, a target of the new machine learning model, one or more performance criteria of the new machine learning model, a source domain of the new machine learning model, or a target domain of the new machine learning model.

5. The method of claim 2, wherein the input comprises a set of notes for building the new machine learning model.

6. The method of claim 2, wherein the input comprises code for building the new machine learning model.

7. The method of claim 2, wherein the input comprises a set of training data for training the new machine learning model.

8. The method of claim 1, wherein the existing machine learning models are directed to a similar domain space as the new machine learning model.

9. The method of claim 1, wherein the existing machine learning models are directed to a similar functional space as the new machine learning model.

10. The method of claim 1, wherein the search parameter for the search is further based on an input from the human user which triggered the event.

11. The method of claim 1, wherein metadata describing the new machine learning model matches metadata describing the existing data from the existing machine leaning models.

12. The method of claim 1, wherein individual items of the portion of the existing data are ranked.

13. The method of claim 12, wherein the individual items of the portion of the existing data are ranked according to at least one of: an assessed relevance to inputs from the human user which triggered the event, reuse of the individual items of the portion of the existing data by other users, a target performance metric for the new machine learning model, or a performance metric of an existing machine learning model from which the individual items are extracted.

14. The method of claim 12, wherein the individual items include features to be added to a set of training data for the new machine learning model, and the features are ranked according to magnitudes of effects that an addition of the features are expected to have on a performance of the new machine learning model.

15. The method of claim 1, wherein the user feedback comprises a selection by the human user of a suggested existing machine learning model or a feature of an existing machine learning model for reuse in the new machine learning model.

16. The method of claim 1, wherein the user feedback comprises the human user ignoring the suggestion.

17. The method of claim 1, wherein the user feedback comprises the human user selecting a graphical user interface feature associated with the suggestion.

18. The method of claim 1, further comprising: recording the user feedback.

19. A non-transitory computer-readable medium storing instructions which, when executed by a processing system including at least one processor, cause the processing system to perform operations, the operations comprising:

monitoring interactions of a human user with a platform for building machine learning models, where the human user is using the platform to build a new machine learning model;

detecting, within the interactions, an event that triggers a suggestion feature;

performing a search of a data source for existing data from existing machine learning models which can be reused to build the new machine learning model, using information about the event, wherein a search parameter for the search is based on a current context of a building process for building the new machine learning model;

presenting a suggestion to the human user to reuse a portion of the existing data discovered in the search in the new machine learning model;

receiving a user feedback in response to the suggestion; and generating an updated suggestion in response to the user feedback.

20. A device comprising:

a processing system including at least one processor; and a non-transitory computer-readable medium storing instructions which, when executed by the processing system, cause the processing system to perform operations, the operations comprising:

monitoring interactions of a human user with a platform for building machine learning models, where the human user is using the platform to build a new machine learning model;

detecting, within the interactions, an event that triggers a suggestion feature;

performing a search of a data source for existing data from existing machine learning models which can be reused to build the new machine learning model, using information about the event, wherein a search parameter for the search is based on a current context of a building process for building the new machine learning model;

presenting a suggestion to the human user to reuse a portion of the existing data discovered in the search in the new machine learning model;

receiving a user feedback in response to the suggestion; and generating an updated suggestion in response to the user feedback.

* * * * *